United States Patent
Maeda (10) Patent No.: US 8,744,520 B2
(45) Date of Patent: Jun. 3, 2014

(54) RADIO COMMUNICATION APPARATUS, RADIO COMMUNICATION METHOD AND PROGRAM

(75) Inventor: Tatsuo Maeda, Kanagawa (JP)

(73) Assignee: Sony Corporation, Tokyo (JP)

( * ) Notice: Subject to any disclaimer, the term of this patent is extended or adjusted under 35 U.S.C. 154(b) by 1057 days.

(21) Appl. No.: 12/705,276

(22) Filed: Feb. 12, 2010

(65) Prior Publication Data

US 2010/0216507 A1    Aug. 26, 2010

(30) Foreign Application Priority Data

Feb. 23, 2009   (JP) .............................. P2009-039940

(51) Int. Cl.
*H04M 1/00*   (2006.01)
(52) U.S. Cl.
USPC .... 455/553.1; 455/41.2; 455/90.2; 455/562.1
(58) Field of Classification Search
USPC ......... 455/41.2, 41.1, 410, 411, 562.1, 422.1, 455/553.1, 574, 558, 90.2
See application file for complete search history.

(56) References Cited

U.S. PATENT DOCUMENTS

| | | | | |
|---|---|---|---|---|
| 7,322,863 B2 * | 1/2008 | Rapp | ........................ | 439/620.01 |
| 7,911,322 B2 * | 3/2011 | Suzuki et al. | .................. | 340/5.6 |
| 8,260,199 B2 * | 9/2012 | Kowalski | ...................... | 455/41.1 |
| 2005/0234778 A1 * | 10/2005 | Sperduti et al. | ................. | 705/22 |
| 2007/0126584 A1 * | 6/2007 | Hyde et al. | .................. | 340/572.4 |
| 2011/0059694 A1 * | 3/2011 | Audic | .......................... | 455/41.1 |
| 2012/0173050 A1 * | 7/2012 | Bernstein et al. | ................. | 701/2 |
| 2013/0012127 A1 * | 1/2013 | Orihara et al. | ............... | 455/41.1 |

FOREIGN PATENT DOCUMENTS

| | | |
|---|---|---|
| JP | 09-107325 | 4/1997 |
| JP | 11-280319 | 10/1999 |
| JP | 2004-364145 | 12/2004 |
| JP | 2006-072706 | 3/2006 |

* cited by examiner

*Primary Examiner* — Sujatha Sharma
(74) *Attorney, Agent, or Firm* — Finnegan, Henderson, Farabow, Garrett & Dunner, LLP (57) ABSTRACT

There is provided a radio communication apparatus including a first radio communication unit that performs proximity communication by first radio communication, a second radio communication unit that performs the proximity communication by second radio communication via a magnetic field, a detection unit that detects the magnetic field generated in the second radio communication, and a control unit that controls radio communication by the first radio communication unit based on a detection result detected by the detection unit.

9 Claims, 9 Drawing Sheets

RADIO COMMUNICATION APPARATUS, RADIO COMMUNICATION METHOD AND PROGRAM

BACKGROUND OF THE INVENTION

1. Field of the Invention

The present invention relates to a radio communication apparatus, a radio communication method, and a program, and in particular to a radio communication apparatus that transmits/receives data by using a plurality of communication instruments, a radio communication method, and a program.

2. Description of the Related Art

In recent years, communication apparatuses that perform long-range radio communication such as WLAN (Wireless LAN) and Bluetooth (registered trademark) and those that perform non-contact communication such as a non-contact IC card and RFID (Radio Frequency Identification) have been widely used. With widespread use of a plurality of types of radio communication instruments, high-speed data transmission by using a plurality of radio communication instruments is being discussed. In Japanese Patent Application Laid-Open No. 2004-364145, for example, after an IC card to be a communication partner in an IC card system is identified, high-speed data transmission is achieved by switching to a communication protocol that performs Bluetooth communication.

Also, radio communication capable of performing large-capacity communication by proximity large-capacity radio communication (non-contact communication, TransferJet) using electric field couplers capable of mutually establishing electric field coupling is proposed. For example, simultaneous transmission/reception of different data by incorporating a radio communication system by an IC card system and that by TransferJet into one radio communication apparatus can be considered.

SUMMARY OF THE INVENTION

However, power consumption of proximity large-capacity radio communication (TransferJet) during communication is large and thus, if TransferJet is mounted on a mobile phone or mobile terminal, there is an issue that it is necessary to stop operation when communication is not performed. A method of starting communication by a specific operation being performed by the terminal owner for communication can be considered as a method of activating the proximity large-capacity radio communication. While power consumption of the proximity large-capacity radio communication during communication is large, communication is completed in a very short time due to large-capacity transmission capabilities. Therefore, consumed power is small and large power consumption does not pose an issue if the proximity large-capacity radio communication is activated by the terminal owner only for communication.

When, on the other hand, communication is performed without a specific operation being performed by the terminal owner, activating the proximity large-capacity radio communication at predetermined intervals and continuing communication only when communication is necessary can be considered. Accordingly, when compared with constant activation, power consumption can be reduced. Here, there is an issue that while it is preferable to increase intervals at which the proximity large-capacity radio communication is activated to reduce power consumption, communication may not be performable when necessary if the intervals at which the proximity large-capacity radio communication is activated are long.

In light of the foregoing, it is desirable to provide a novel and improved radio communication apparatus, radio communication method, and program capable of suppressing power consumption without convenience of the user being sacrificed in proximity large-capacity radio communication.

According to an embodiment of the present invention, there is provided a radio communication apparatus which includes a first radio communication unit that performs proximity communication by first radio communication, a second radio communication unit that performs the proximity communication by second radio communication via a magnetic field, a detection unit that detects the magnetic field generated in the second radio communication, and a control unit that controls radio communication by the first radio communication unit based on a detection result detected by the detection unit.

According to the above configuration, in a radio communication apparatus provided with a first radio communication unit that performs proximity communication by first radio communication and a second radio communication unit that performs proximity communication by second radio communication via a magnetic field, the magnetic field generated in the second radio communication is detected and radio communication by the first radio communication unit is controlled based on the detected result. Accordingly, there is no need to constantly activate the first radio communication by the first radio communication unit and the need for a specific operation by the user is eliminated so that power consumption can be reduced by activating the first radio communication only when necessary.

Further, the control unit may activate the first radio communication by the first radio communication unit when the magnetic field generated in the second radio communication is detected by the detection unit.

Further, the control unit may exercise control so that the first radio communication unit is made communicable at predetermined intervals, and if the magnetic field generated in the second radio communication is detected by the detection unit, the control unit may exercise control so that the first radio communication unit is made communicable at intervals shorter than the predetermined intervals.

Further, the control unit may exercise control so that the first radio communication unit is made communicable at predetermined intervals, and if the magnetic field generated in the second radio communication is detected by the detection unit, the control unit may exercise control so that the first radio communication unit is made continuously communicable.

Further, the detection unit may detect strength of the magnetic field generated in the second radio communication.

Further, the detection unit may detect a predetermined code format of a signal contained in the magnetic field generated in the second radio communication.

Further, the detection unit may detect a predetermined message contained in the magnetic field generated in the second radio communication.

Further, the predetermined message detected by the detection unit and contained in the magnetic field may be a message indicating that communication by the first radio communication is possible.

According to another embodiment of the present invention, there is provided a radio communication method for a radio communication apparatus having a first radio communication unit that performs proximity communication by first radio communication and a second radio communication unit that performs the proximity communication by second radio communication via a magnetic field, which includes the steps of detecting the magnetic field generated in the second radio communication by a detection unit provided in the ratio communication apparatus, and controlling radio communication by the first radio communication unit based on a detection result detected by the detection step.

According to another embodiment of the present invention, there is provided a program causing a computer to function as a radio communication apparatus, the radio communication apparatus including a first radio communication unit that performs proximity communication by first radio communication, a second radio communication unit that performs the proximity communication by second radio communication via a magnetic field, a detection unit that detects the magnetic field generated in the second radio communication, and a control unit that controls radio communication by the first radio communication unit based on a detection result detected by the detection unit.

According to the embodiments of the present invention described above, power consumption can be suppressed without sacrificing convenience of the user in proximity large-capacity radio communication.

DETAILED DESCRIPTION OF THE EMBODIMENTS

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

[1] Purpose of the Present Invention
[2] Overview of Radio Communication Apparatus
[3] Functional Configuration of Radio Communication Apparatus
[4] Details of Radio Communication Processing by Radio Communication Apparatus
[5] Concrete Example of Radio Communication Apparatus
[1] Purpose of the Present Invention First, the purpose of the present embodiment will be described. In recent years, communication apparatuses that perform long-range radio communication such as WLAN (Wireless LAN) and Bluetooth (registered trademark) and those that perform non-contact communication such as a non-contact IC card and RFID (Radio Frequency Identification) have been widely used. With widespread use of a plurality of types of radio communication instruments, high-speed data transmission by using a plurality of radio communication instruments is being discussed. For example, after an IC card to be a communication partner in an IC card system is identified, high-speed data transmission is achieved by switching to a communication protocol that performs Bluetooth communication.

Also, radio communication capable of performing large-capacity communication by proximity large-capacity radio communication (non-contact communication, TransferJet) using electric field couplers capable of mutually establishing electric field coupling is proposed. For example, simultaneous transmission/reception of different data by incorporating a radio communication system by an IC card system and that by TransferJet into one radio communication apparatus can be considered.

However, power consumption of proximity large-capacity radio communication (TransferJet) during communication is large and thus, if TransferJet is mounted on a mobile phone or mobile terminal, there is an issue that it is necessary to stop operation when communication is not performed. A method of starting communication by a specific operation being performed by the terminal owner for communication can be considered as a method of activating the proximity large-capacity radio communication.

While power consumption of the proximity large-capacity radio communication during communication is large, communication is completed in a very short time due to large-capacity transmission capabilities. Therefore, consumed power is small and large power consumption does not pose an issue if the proximity large-capacity radio communication is activated by the terminal owner only for communication.

Figure 1:
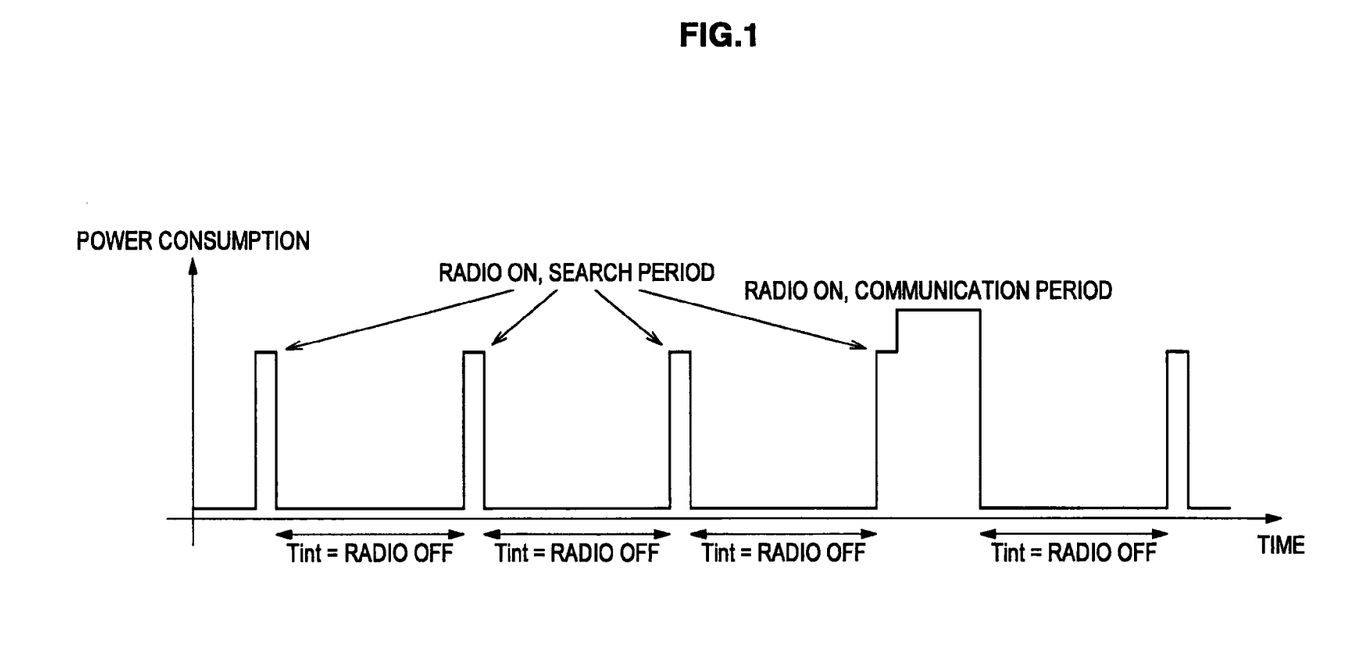
FIG. 1 is an explanatory view illustrating an intermittent operation in general radio communication.

Here, an intermittent operation of general radio communication will be described with reference to FIG. 1. FIG. 1 is an explanatory view illustrating an intermittent operation in general radio communication. When communication is performed without a specific operation being performed by the owner of a terminal, for example, proximity large-capacity radio communication is activated at predetermined intervals by an intermittent operation as shown in FIG. 1 being performed.

Then, communication can be considered to continue only if the communication is necessary. Accordingly, when compared with constant activation, power consumption can be reduced. Here, it is preferable to increase intervals (Tint in FIG. 1) at which the proximity large-capacity radio communication is activated to reduce power consumption.

Figure 2:
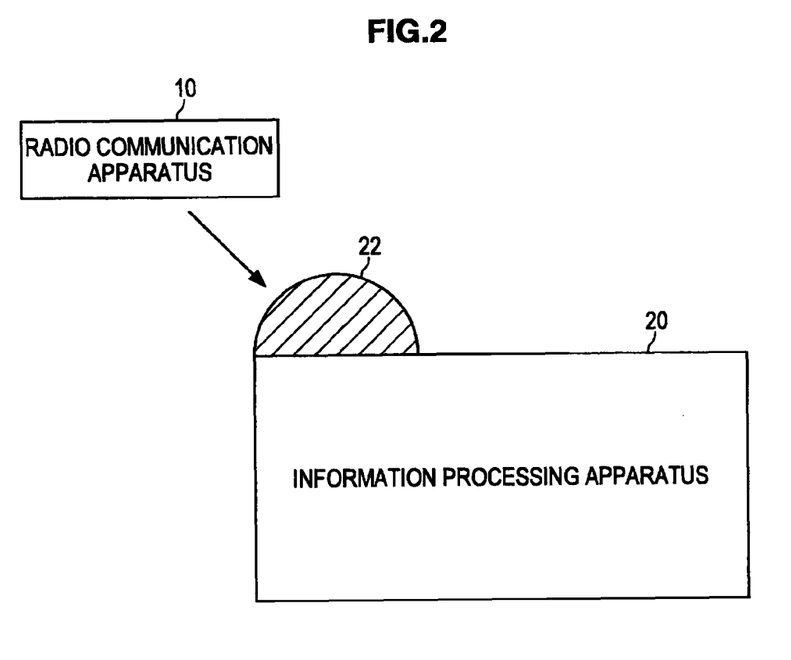
FIG. 2 is an explanatory view illustrating radio communication according to an embodiment of the present invention.

On the other hand, an issue arises that communication may not be performable when necessary if the intervals at which the proximity large-capacity radio communication is activated are long. Radio communication between a radio communication apparatus 10 and an information processing apparatus 20 will be described with reference to FIG. 2. FIG. 2 is an explanatory view illustrating radio communication between the radio communication apparatus 10 and the information processing apparatus 20.

As shown in FIG. 2, a case in which information is captured from the information processing apparatus 20 by bringing the radio communication apparatus 10 mounted with proximity large-capacity radio communication closer to the information processing apparatus 20 can be considered. In this case, the proximity large-capacity radio communication has a narrow communicable range and thus, if Tint described above is long, it is necessary to hold the radio communication apparatus 10 close to the information processing apparatus 20 at least sufficiently longer than Tint. In this case, there is an issue that convenience of the user is sacrificed even if power consumption can be suppressed.

Thus, the radio communication apparatus 10 according to an embodiment of the present invention has been developed by bearing the above circumstances in mind. According to the radio communication apparatus 10 in the present embodiment, power consumption can be suppressed without convenience of the user being sacrificed in proximity large-capacity radio communication.

[2] Overview of Radio Communication Apparatus

As described above, in order to suppress power consumption without convenience of the user being sacrificed in proximity large-capacity radio communication, using another radio communication function by the radio communication apparatus 10 can be considered. A case in which an IC card system is specifically used as the other radio communication function will be described below, but the present embodiment is not limited to such an example and other radio communication functions may also be used.

An IC card system can perform communication in a non-contact fashion mainly in a range of about 10 cm. For example, communication is performed by conforming to near field communication (NFC) having an RF carrier wave frequency of 13.56 MHz and a communication speed of 100 to 400 Kbps. If, for example, an IC chip capable of performing non-contact communication with the radio communication apparatus 10 is provided, non-contact communication is made possible by receiving a carrier wave transmitted from the information processing apparatus (reader/writer apparatus) 20.

Proximity large-capacity radio communication (hereinafter, also called TransferJet) is provided with electrode plates called electric field couplers by which the information processing apparatus 20 functioning as an initiator and the radio communication apparatus 10 functioning as a responder can mutually establish electric field coupling. If the electric field couplers of both the information processing apparatus 20 and the radio communication apparatus 10 are brought closer to within 3 cm to 5 cm, electric field communication is realized by a change in induction field generated by one electric field coupler being sensed by the other electric field coupler. At this point, power of the radio communication apparatus 10 waiting to receive data is particularly consumed.

Since power transmission is assumed in an IC card system, magnetic field strength (magnetic field level) used for communication is high and the frequency is 13.56 MHz, which is lower when compared with proximity large-capacity radio communication. Thus, detection of the presence of a magnetic field generated in the IC card system is easier when compared with detection of an induction field of the proximity large-capacity radio communication. Since both an IC card and TransferJet use proximity radio communication, a communicable area of the IC card and that of TransferJet are very close with 10 cm and 3 cm to 5 cm, respectively.

Thus, in the present embodiment, the radio communication apparatus 10 is enabled to perform efficient proximity large-capacity radio communication (TransferJet) that suppresses power consumption by using the radio communication function by an IC card system. More specifically, the radio communication apparatus 10 is mounted with an antenna for electric field coupling to enable proximity large-capacity radio communication (TransferJet) and also an antenna for magnetic field coupling to enable radio communication by an IC card. Then, the proximity large-capacity radio communication (TransferJet) is controlled by detecting a magnetic field of the IC card.

[3] Functional Configuration of Radio Communication Apparatus

Figure 3:
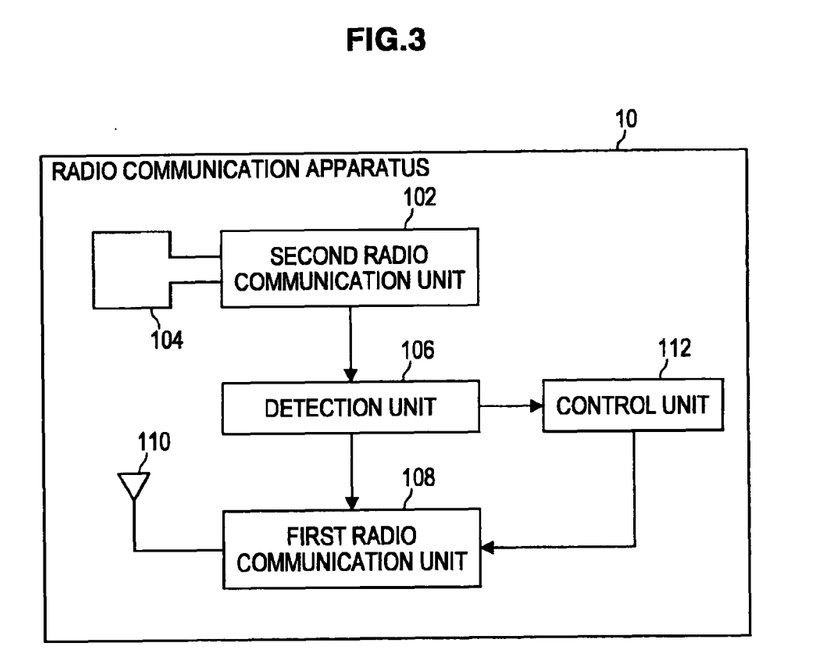
FIG. 3 is a block diagram showing a functional configuration of a radio communication apparatus according to the embodiment.
Figure 4:
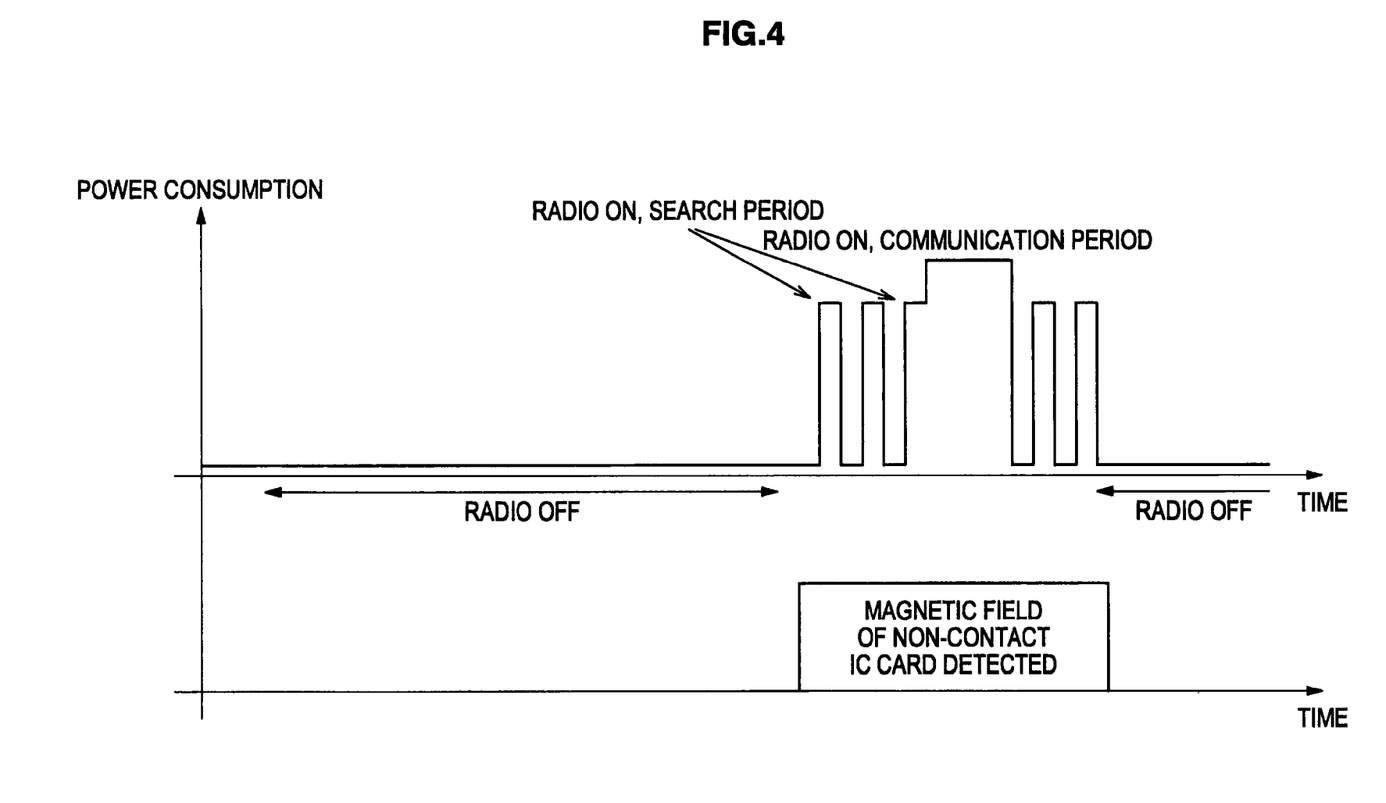
FIG. 4 is an explanatory view illustrating radio communication control of the radio communication apparatus according to the embodiment.
Figure 5:
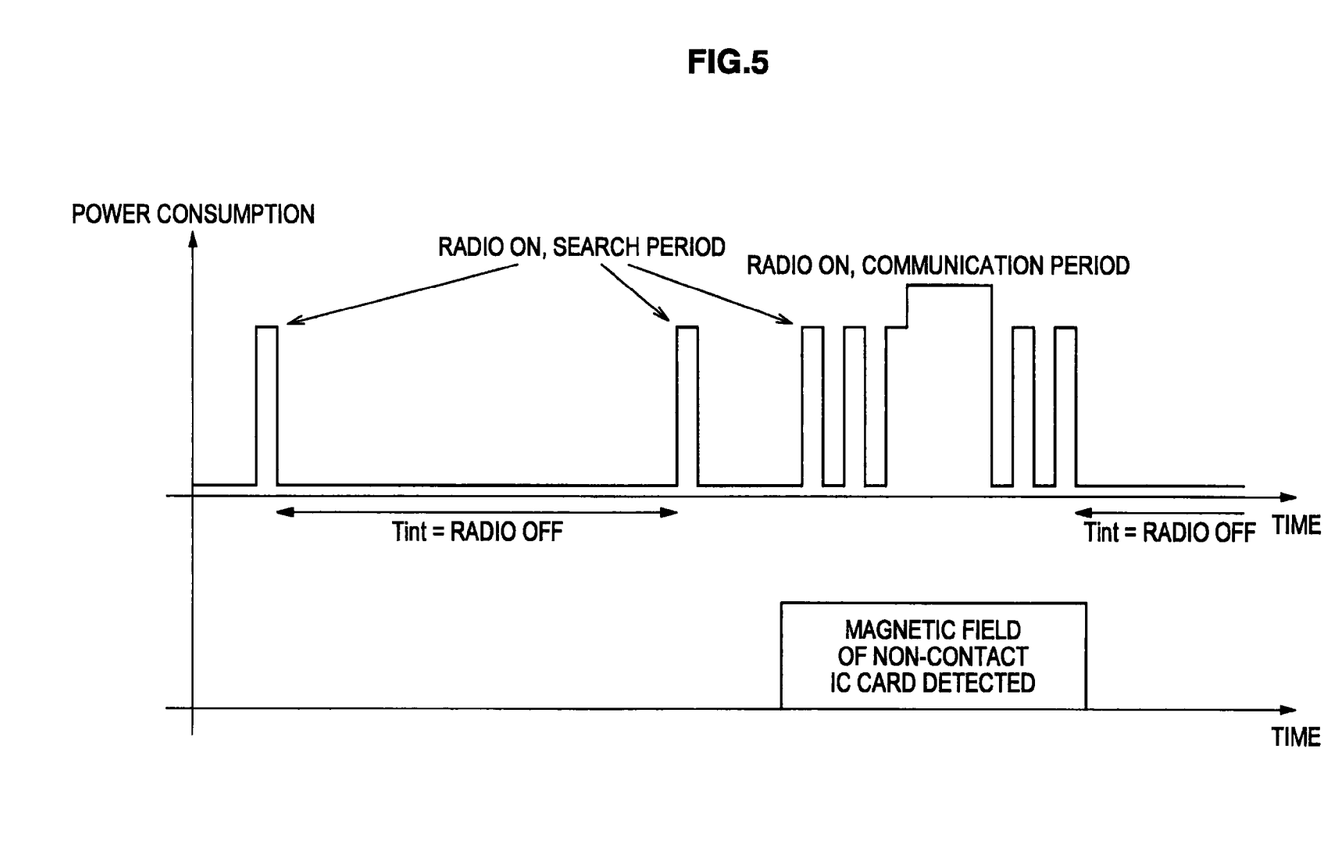
FIG. 5 is an explanatory view illustrating radio communication control of the radio communication apparatus according to the embodiment.
Figure 6:
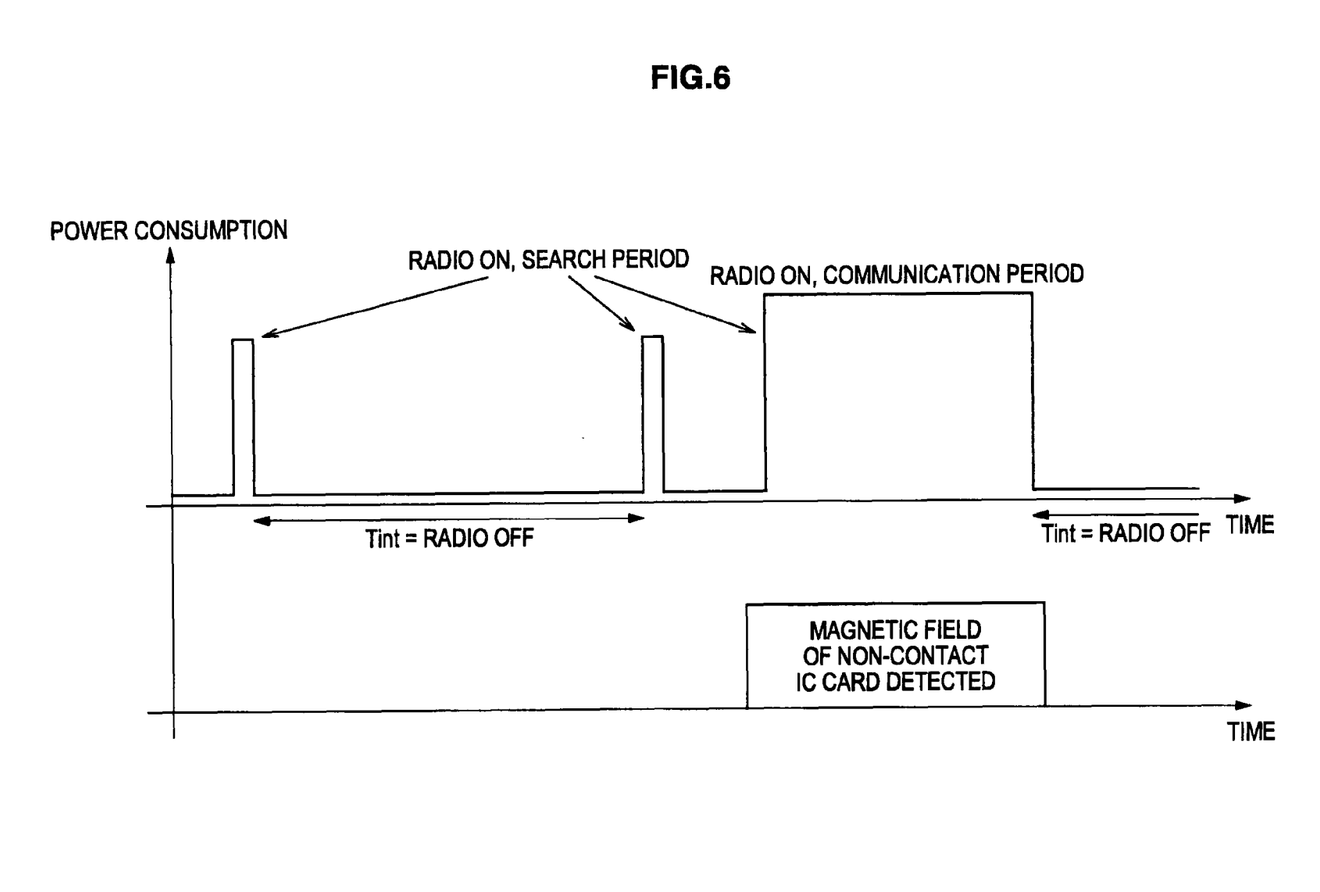
FIG. 6 is an explanatory view illustrating radio communication control of the radio communication apparatus according to the embodiment.

In the foregoing, an overview of the radio communication apparatus 10 has been given. Next, the functional configuration of the radio communication apparatus 10 will be described with reference to FIG. 3. When the functional configuration of the radio communication apparatus 10 shown in FIG. 3 is described, FIGS. 4 to 6 are referred to when appropriate. FIG. 3 is a block diagram showing the functional configuration of the radio communication apparatus 10. FIGS. 4 to 6 are explanatory views each illustrating radio communication control in the radio communication apparatus 10.

As shown in FIG. 3, the radio communication apparatus 10 includes a second radio communication unit 102, a loop antenna 104, a detection unit 106, a first radio communication unit 108, an antenna for electric field coupling 110, a control unit 112, and the like. The second radio communication unit 102 has a function to perform proximity communication by second radio communication via a magnetic field. More specifically, the second radio communication unit 102 performs non-contact communication by means of a magnetic field via the loop antenna 104.

The above IC chip capable of performing non-contact communication, for example, can be exemplified as the second radio communication unit 102. An IC card system using an IC chip can perform communication in a non-contact fashion mainly in a range of about 10 cm. For example, communication is performed by conforming to near field communication (NFC) having the RF carrier wave frequency of 13.56 MHz and the communication speed of 100 to 400 Kbps. Communication by the IC card system is an example of the second radio communication.

In the IC card system, in order to generate a strong magnetic field in a certain range, a loop antenna is used and a high-frequency current is passed thereto to generate an AC magnetic field (RF magnetic field) of radio frequency. If, as shown in FIG. 2, the radio communication apparatus 10 having the loop antenna 104 is brought closer to an RF magnetic field when the RF magnetic field is generated in the information processing apparatus 20, the radio communication apparatus 10 receives the magnetic field, which is converted to power.

The loop antenna 104 is an antenna for magnetic field coupling and has a function to perform non-contact communication by means of a magnetic field. An RF magnetic field received via the loop antenna 104 is amplified or demodulated by the radio communication apparatus 10 before a data signal is received.

The detection unit 106 has a function to detect a magnetic field generated in the second radio communication. As described above, the second radio communication unit 102 receives a strong magnetic field such as an RF magnetic field generated by another apparatus such as the information processing apparatus 20. The detection unit 106 may detect the strength of a magnetic field (RF magnetic field) received from the second radio communication unit 102.

Moreover, a data signal received by the second radio communication unit 102 is decoded or an error is detected. The detection unit 106 may detect a predetermined code format of a signal contained in a magnetic field generated by the second radio communication unit 102 in the second radio communication. Further, the detection unit 106 may detect a predetermined message contained in a magnetic field. The predetermined message is, for example, a message indicating that communication by first radio communication is possible.

Detection results by the detection unit 106 may be used by the second radio communication unit 102. The detection unit 106 may be shared by a detection function which the second radio communication unit 102 provides for the second radio communication.

The first radio communication unit 108 has a function to perform proximity communication by the first radio communication. More specifically, the first radio communication unit 108 performs non-contact communication by means of an electric field via the antenna for electric field coupling 110. The above proximity large-capacity radio communication (TransferJet), for example, can be exemplified as the first radio communication unit 108. When, as described above, an electric field coupler provided in the information processing apparatus 20 and that provided in the radio communication apparatus 10 are brought closer to within 3 cm to 5 cm, electric field communication is realized by a change in induction field generated by one electric field coupler being sensed by the other electric field coupler.

The antenna for electric field coupling 110 is an antenna for electric field coupling and has a function to perform non-contact communication by means of an electric field. The antenna for electric field coupling 110 is driven by, for example, a frequency band about 100 times that of the loop antenna 104, that is, a GHz band. Thus, in the present embodiment, an antenna different from the loop antenna 104 is used or a frequency band higher than that of the loop antenna 104 is used. Accordingly, antenna efficiency can be prevented from decreasing by antennas being coupled extending over communication systems.

The control unit 112 has a function to control radio communication by the first radio communication unit 108 based on a detection result detected by the detection unit 106. More specifically, the control unit 112 activates the first radio communication by the first radio communication unit 108. For example, as shown in FIG. 4, the control unit 112 activates the first radio communication unit 108 when a magnetic field of a non-contact IC card is detected by the detection unit 106.

In FIG. 4, when a magnetic field of a non-contact IC card is detected, radio communication of the first radio communication unit 108 is turned on to search for a communication partner at short intervals. The control unit 112 may exercise control to make the first radio communication unit 108 continuously communicable when a magnetic field of a non-contact IC card is detected by the detection unit 106.

Then, when a connection establishment request is received from the communication partner, the first radio communication unit 108 performs authentication processing and, if the authentication processing is finished successfully, a communication period is entered in which the first radio communication unit 108 is connected to the communication partner such that data can mutually be communicated. Accordingly, if it is not necessary to perform communication by the first radio communication unit 108, the first radio communication unit 108 is not activated and radio communication can be turned on for a short time only when it is necessary to perform communication by the first radio communication unit 108. Therefore, power consumption can be suppressed to power necessary for performing radio communication by the second radio communication unit 102, when the user of the radio communication apparatus 10 does not have to perform a specific operation to perform radio communication by the first radio communication unit 108 and when the first radio communication unit 108 is in a standby state. If an IC card system is assumed as the second radio communication unit 102, the design of the IC card system is based on absence of batteries on a card side and thus, power consumption on the card side is extremely small.

If the first radio communication unit 108 is made communicable at predetermined intervals and, as shown in FIG. 5, a magnetic field of a non-contact IC card is detected by the detection unit 106, the first radio communication unit 108 may be made communicable at intervals shorter than normal intervals. Further, in this case, intervals (Tint in FIG. 5) at which the first radio communication unit 108 is activated may be made longer than Tint in the case of FIG. 1. Accordingly, as described with reference to FIG. 1, circumstances of non-communicability when necessary can be avoided thanks to longer Tint. If, as shown in FIG. 6, the first radio communication unit 108 is made communicable at predetermined intervals and a magnetic field of a non-contact IC card is detected by the detection unit 106, the first radio communication unit 108 may be made continuously communicable.

Moreover, as described above, the detection unit 106 can detect magnetic field strength and a predetermined code format of a signal contained in a magnetic field. Further, the detection unit 106 can detect a predetermined message contained in a magnetic field.

Then, the control unit 112 controls radio communication by the first radio communication unit 108 based on a detection result detected by the detection unit 106. That is, if an RF magnetic field, which is a magnetic field generated in the second radio communication, is detected by the detection unit 106, the control unit 112 activates the first radio communication unit 108. Magnetic field strength of an IC card system, which is an example of the second radio communication, depends on the distance of the magnetic field from a source thereof. Similarly, electromagnetic field strength of an output electromagnetic field of proximity large-capacity radio communication, which is an example of the first radio communication, depends on the distance of the electromagnetic field from a source thereof.

Therefore, if a transmitting antenna of an IC card and an antenna of a proximity large-capacity radio are arranged in close proximity, the presence of the proximity large-capacity radio can be inferred by detecting the strength of a magnetic field of the IC card system. Since it is relatively easy to detect a magnetic field of 13.56 Hz in the IC card system, the presence of the proximity large-capacity radio can easily be confirmed by magnetic field strength being detected by the detection unit 106.

When, as described above, only magnetic field strength of 13.56 MHz is simply detected to activate the first radio communication unit 108, an issue of erroneous detection is posed. This is because the magnetic field of 13.56 MHz used by an IC card system is present in an ISM band and thus can also be used for other purposes. Therefore, detection of a signal format (code format) specific to an IC card, as well as simple detection magnetic field strength of 13.56 MHz, can be considered. For the signal format specific to an IC card, for example, the Manchester code format may be detected.

An IC card system is used exclusively for security purposes and thus, it is difficult to interpret a signal itself, but since the signal format itself is not a security target, the format thereof can be detected. Therefore, the possibility of erroneous detection can be reduced by detecting not only magnetic field strength of 13.56 MHz, but also the format of Manchester code.

If a predetermined message contained in a magnetic field is detected by the detection unit 106, the control unit 112 activates the first radio communication unit 108. If, for example, a message indicating that communication by the first radio communication is possible is contained in a magnetic field, communication by the first radio communication unit 108 is controlled by detecting such a message. Thus, more efficient communication can be performed by detecting a message contained in a magnetic field to control communication by the first radio communication unit 108.

A concrete detection method by the detection unit 106 and a concrete control method by the control unit 112 will be described below in detail. In the foregoing, the functional configuration of the radio communication apparatus 10 has been described.

[4] Details of Radio Communication Processing by Radio Communication Apparatus

Figure 7:
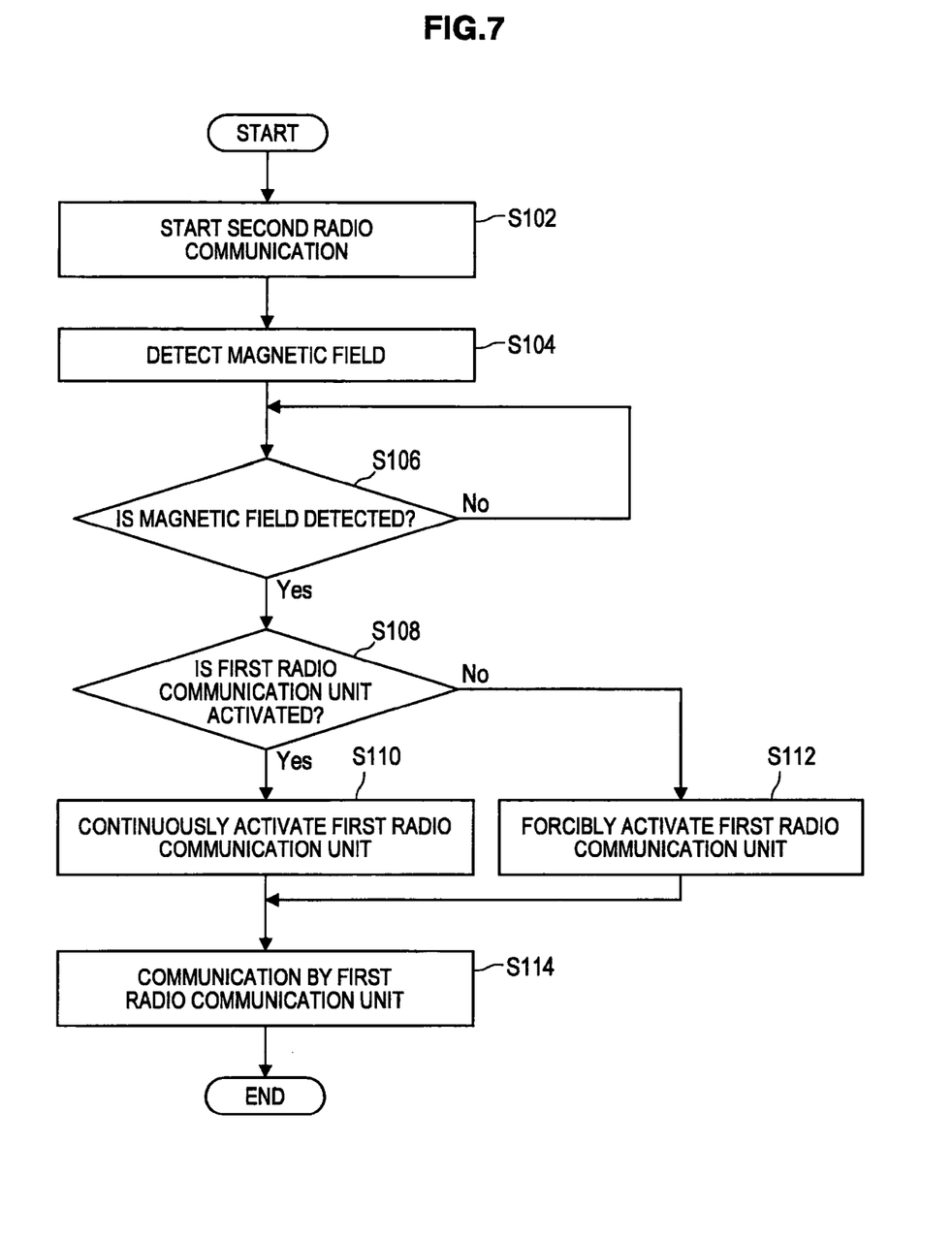
FIG. 7 is a flow chart showing radio communication processing by the radio communication apparatus according to the embodiment.

Next, details of radio communication processing by the radio communication apparatus 10 will be described with reference to FIG. 7. FIG. 7 is a flow chart showing radio communication processing by the radio communication apparatus 10. As shown in FIG. 7, the second radio communication unit 102 first starts proximity communication by the second radio communication (S102).

Then, the detection unit 106 detects a magnetic field generated in the second radio communication by the second radio communication unit 102 that started the proximity communication at step S102 (S104). The target to be detected at step S104 may be, as described above, the strength of a magnetic field generated in the second radio communication. The detection unit 106 may also detect a predetermined code format of a signal contained in a magnetic field or a predetermined message contained in a magnetic field.

Then, the control unit 112 determines whether a second magnetic field is detected (S106). If the strength of a magnetic field is detected at step S104, the control unit 112 determines whether the strength of the detected magnetic field is the desired strength of the detected magnetic field.

If a predetermined code format is detected at step S104, the control unit 112 determines whether the detected code format is a code format representing a signal of the second radio communication. Further, if a predetermined message is detected at step S104, the control unit 112 determines whether the detected message is a message indicating that communication by the first radio communication is possible.

Next, the control unit 112 determines whether the first radio communication unit 108 is activated (S108). If, as described above, the first radio communication unit 108 is activated at predetermined intervals, a case in which communication of the first radio communication unit 108 is in an ON state at step S108 can be considered. If the first radio communication unit 108 is not activated at predetermined intervals, communication of the first radio communication unit 108 is in an OFF state.

If it is determined that the first radio communication unit 108 is activated at step S108, the control unit 112 continuously activates the first radio communication unit 108 (S110). On the other hand, if it is determined that the first radio communication unit 108 is not activated at step S108, the control unit 112 forcibly activates the first radio communication unit 108 (S112).

If, for example, as shown in FIG. 4, radio communication is turned off until a magnetic field of a non-contact IC card is detected by the detection unit 106, the first radio communication unit 108 is forcibly activated at step S112. Then, as shown in FIG. 4, radio communication may be turned on to search for a communication partner at short intervals or radio communication may be continuously turned on.

If, as shown in FIG. 6, radio communication of the first radio communication unit 108 is turned on at predetermined intervals, the first radio communication unit 108 is continuously activated at step S110. Alternatively, as shown in FIG. 5, radio communication of the first radio communication unit 108 may be turned on at intervals shorter than normal intervals at step S110.

Returning to FIG. 6, after the first radio communication unit 108 is continuously activated at step S110 or the first radio communication unit 108 is forcibly activated at step S112, communication by the first radio communication is started (S114).

[5] Concrete Communication Control Method of Radio Communication Apparatus

In the foregoing, radio communication processing by the radio communication apparatus 10 has been described. Next, a concrete communication control method in the radio communication apparatus 10 will be described with reference to FIGS. 7 to 11. As shown in FIG. 7, the radio communication apparatus 10 includes the loop antenna 104, the second radio communication unit 102, a detector 106', the first radio communication unit 108, the antenna for electric field coupling 110, and the like. The detector 106' is an example of the detection unit 106.

The detector 106' detects the presence of a magnetic field by detecting an electromotive force generated in the loop antenna 104 by a magnetic field used for the second radio communication. Then, the detected voltage is provided to the first radio communication unit 108. The first radio communication unit 108 may be provided with the above function of the control unit 112. In such a case, the first radio communication unit 108 to which the detected voltage is provided from the detector 106' turns on communication when the level of the voltage exceeds a desired value.

Figure 8:
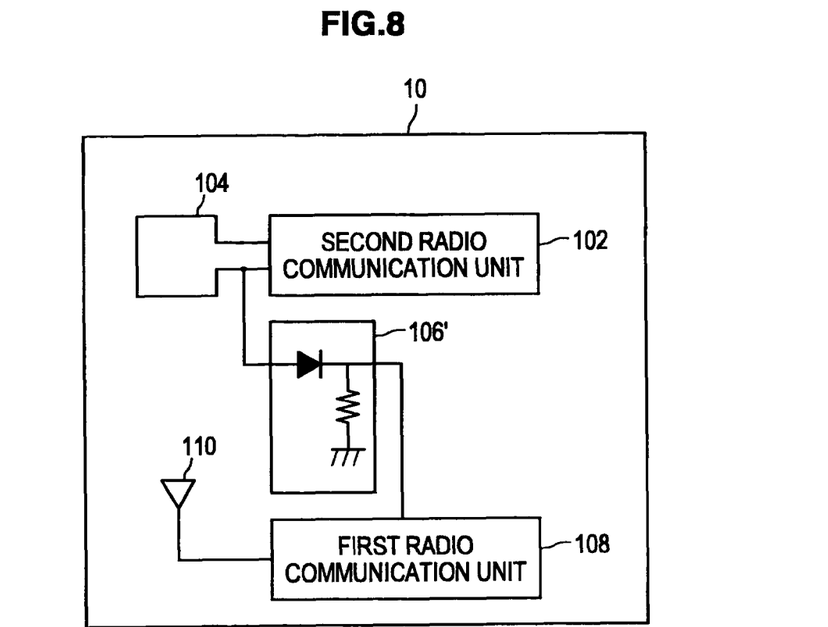
FIG. 8 is a configuration diagram showing a concrete example of the radio communication apparatus according to the embodiment.

Next, another concrete configuration of the radio communication apparatus 10 will be described with reference to FIG. 8. As shown in FIG. 8, the radio communication apparatus 10 is provided with the loop antenna 104, the second radio communication unit 102, the first radio communication unit 108, the antenna for electric field coupling 110, and the like. In the radio communication apparatus 10 shown in FIG. 8, the second radio communication unit 102 may be provided with the function of the detection unit 106. In such a case, the second radio communication unit 102 detects a signal format indicating communication by an IC card system (second radio communication) or a code format representing the signal. Then, if a signal format is detected, the second radio communication unit 102 transmits an activation signal to turn on the first radio communication to the first radio communication unit 108.

Figure 9:
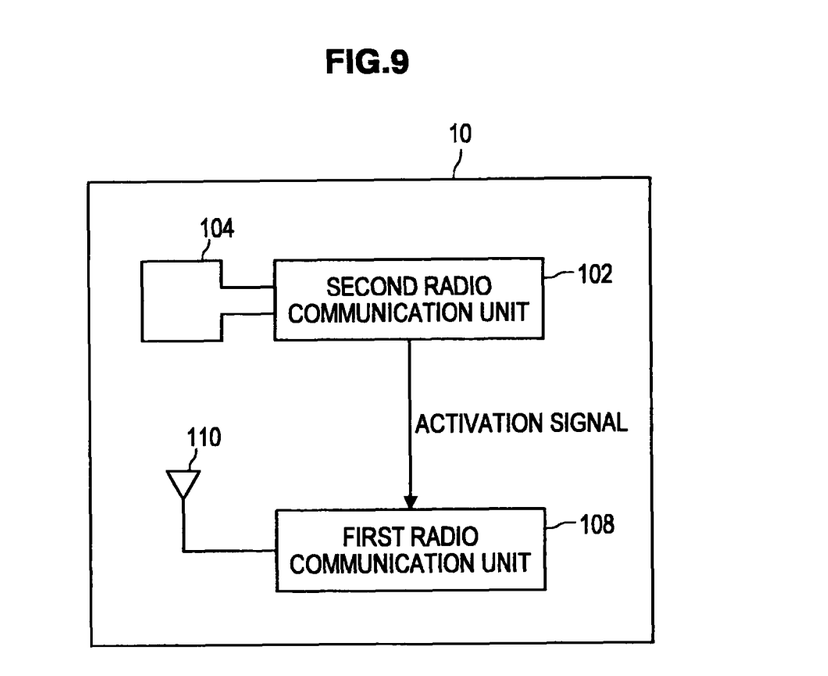
FIG. 9 is a configuration diagram showing a concrete example of the radio communication apparatus according to the embodiment.

A processing flow of the first radio communication unit 108 and the second radio communication unit 102 of the radio communication apparatus 10 having the configuration shown in FIG. 8 will be described with reference to FIG. 9. FIG. 9 is a timing chart illustrating processing of the first radio communication unit 108 and the second radio communication unit 102 in FIG. 8. As shown in FIG. 9, the second radio communication unit 102 first detects a magnetic field of 13.56 MHz via the loop antenna 104 (S202). Then, the second radio communication unit 102 performs synchronous processing of data (S204).

If the Manchester code format, which is a signal format specific to an IC card, or the like is detected in the synchronous processing at step S204, the second radio communication unit 102 transmits an activation signal to the first radio communication unit 108 (S206). The first radio communication unit 108 to which an activation signal is transmitted at step S206 activates communication by the first radio communication (large-capacity radio communication: TransferJet) (S208). Then, the first radio communication unit 108 starts communication by the first radio communication (S210).

After transmitting the activation signal to the first radio communication unit 108 at step S206, the second radio communication unit 102 may perform communication by the second radio communication by performing processing such as normal error detection (S212). Thus, with the configuration of the radio communication apparatus 10 shown in FIG. 8, communication by the first radio communication unit 108 can be controlled more precisely than with the configuration shown in FIG. 7. That is, the radio communication apparatus 10 shown in FIG. 8 can reduce erroneous detection by detecting not only the strength of a magnetic field, but also the signal format used for the first radio communication.

Figure 10:
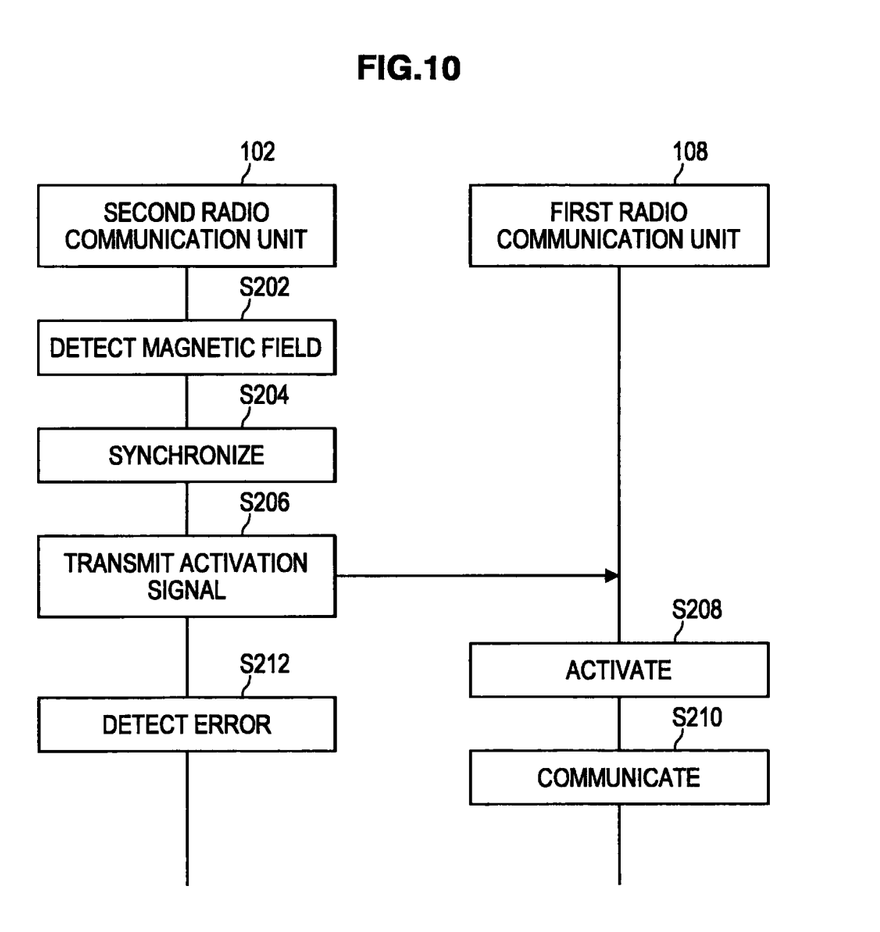
FIG. 10 is an explanatory view illustrating a concrete communication control method in the radio communication apparatus according to the embodiment.

Next, another concrete configuration of the radio communication apparatus 10 will be described with reference to FIG. 10. As shown in FIG. 10, the radio communication apparatus 10 is provided with the loop antenna 104, the second radio communication unit 102, the first radio communication unit 108, the antenna for electric field coupling 110, the control unit 112, and the like. In the radio communication apparatus 10 shown in FIG. 10, the second radio communication unit 102 may be provided with the function of the detection unit 106. In such a case, the second radio communication unit 102 detects a specific message contained in a magnetic field detected via the loop antenna 104 and provides the message to the control unit 112.

The control unit 112 provides the specific message provided from the second radio communication unit 102 to the first radio communication unit 108. If the message provided from the control unit 112 is a message to activate the first radio communication, the first radio communication unit 108 turns on communication. After authentication information is transmitted/received, the second radio communication unit 102 may provide a specific message to the control unit 112. If the first radio communication unit 108 has a function similar to that of the control unit 112, a specific message may directly be transmitted from the second radio communication unit 102 to the first radio communication unit 108.

Figure 11:
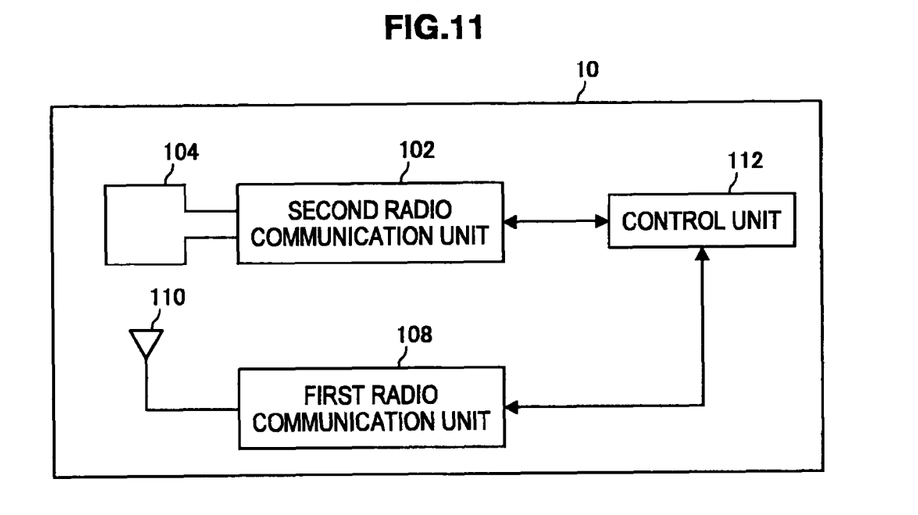
FIG. 11 is a configuration diagram showing a concrete example of the radio communication apparatus according to the embodiment.
Figure 12:
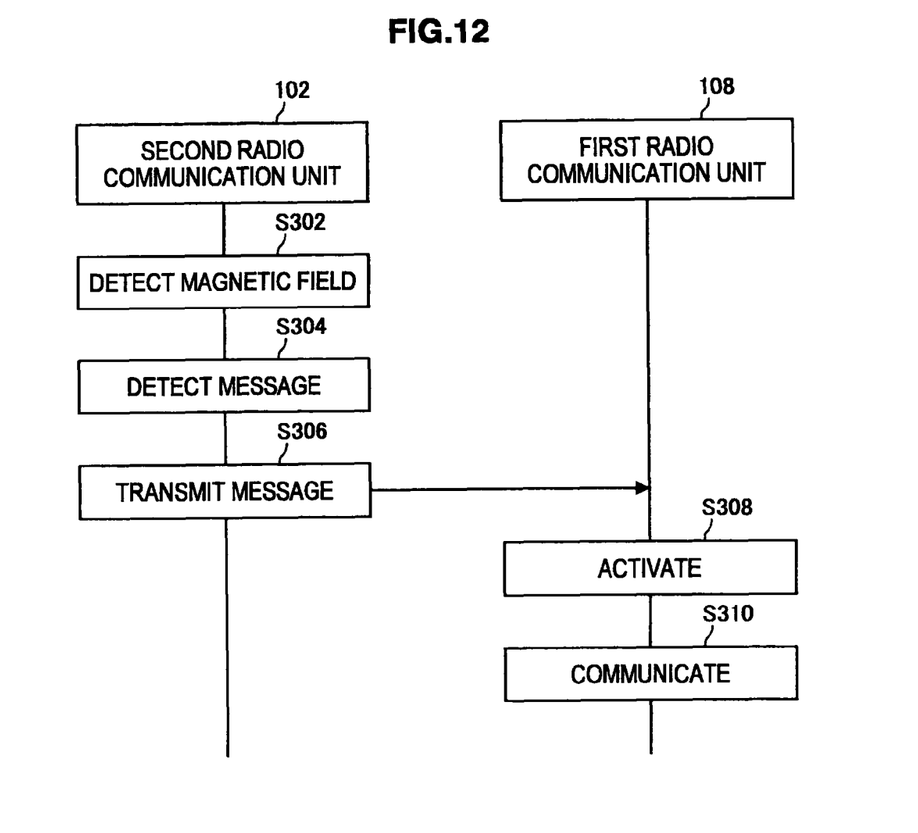
FIG. 12 is an explanatory view illustrating a concrete communication control method in the radio communication apparatus according to the embodiment.

Next, a processing flow of the first radio communication unit 108 and the second radio communication unit 102 of the radio communication apparatus 10 having the configuration shown in FIG. 10 will be described with reference to FIG. 11. FIG. 11 is a timing chart illustrating processing of the first radio communication unit 108 and the second radio communication unit 102 in FIG. 10. As shown in FIG. 11, the second radio communication unit 102 first detects a magnetic field of 13.56 MHz via the loop antenna 104 (S302). Then, the second radio communication unit 102 detects a specific message contained in a magnetic field detected at step S302 (S304).

The specific message detected at step S304 is a message to start communication by TransferJet, which is an example of the first radio communication and, for example, a message like "TransferJet Ready" can be exemplified. The second radio communication unit 102 that detects a specific message at step S304 transmits the message to the first radio communication unit 108 via the control unit 112 (S306).

After the specific message is received, the first radio communication unit 108 to which the specific message is transmitted from the second radio communication unit 102 at step S306 activates communication by the first radio communication (S308). Then, the first radio communication unit 108 starts communication by the first radio communication (S310). Thus, with the configuration of the radio communication apparatus 10 shown in FIG. 10, communication by the first radio communication unit 108 can be controlled more precisely than with the configuration of the radio communication apparatus 10 shown in FIG. 8. That is, the radio communication apparatus 10 shown in FIG. 10 can control the first radio communication more reliably and efficiently than by detecting the signal format because the first radio communication is controlled by using a message to activate the first radio communication unit 108.

In the foregoing, concrete communication control methods of the radio communication apparatus 10 have been described. According to the present embodiment, in a radio communication apparatus provided with the first radio communication unit 108 that performs proximity communication by the first radio communication and the second radio communication unit 102 that performs proximity communication by the second radio communication via a magnetic field, the magnetic field generated in the second radio communication is detected and radio communication by the first radio communication unit 108 is controlled based on a detected result. If, for example, desired strength of the magnetic field generated in the second radio communication is detected, the first radio communication by the first radio communication unit 108 is activated.

Accordingly, there is no need to constantly activate the first radio communication by the first radio communication unit 108 and the need for a specific operation by the user is eliminated so that power consumption can be reduced by activating the first radio communication only when necessary.

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2009-039940 filed in the Japan Patent Office on Feb. 23, 2009, the entire content of which is hereby incorporated by reference.

What is claimed is:

1. A radio communication apparatus comprising:
a first radio communication unit that performs proximity communication by first radio communication;
a second radio communication unit that performs the proximity communication by second radio communication via a magnetic field;
a detection unit that detects the magnetic field generated in the second radio communication; and
a control unit that controls radio communication by the first radio communication unit based on a detection result detected by the detection unit,
wherein the control unit exercises control so that the first radio communication unit is made communicable at predetermined intervals, and
if the magnetic field generated in the second radio communication is detected by the detection unit, the control unit exercises control so that the first radio communication unit is made communicable at intervals shorter than the predetermined intervals.

2. The radio communication apparatus according to claim 1, wherein the control unit activates the first radio communication by the first radio communication unit when the magnetic field generated in the second radio communication is detected by the detection unit.

3. The radio communication apparatus according to claim 1, wherein if the magnetic field generated in the second radio communication is detected by the detection unit, the control unit exercises control so that the first radio communication unit is made continuously communicable.

4. The radio communication apparatus according to claim 1, wherein the detection unit detects strength of the magnetic field generated in the second radio communication.

5. The radio communication apparatus according to claim 1, wherein the detection unit detects a predetermined code format of a signal contained in the magnetic field generated in the second radio communication.

6. The radio communication apparatus according to claim 1, wherein the detection unit detects a predetermined message contained in the magnetic field generated in the second radio communication.

7. The radio communication apparatus according to claim 6, wherein the predetermined message detected by the detection unit and contained in the magnetic field is a message indicating that communication by the first radio communication is possible.

8. A radio communication method for a radio communication apparatus having a first radio communication unit that performs proximity communication by first radio communication and a second radio communication unit that performs the proximity communication by second radio communication via a magnetic field, comprising the steps of:

detecting the magnetic field generated in the second radio communication by a detection unit provided in the ratio communication apparatus; and controlling radio communication by the first radio communication unit based on a detection result detected by the detection step,
wherein controlling radio communication includes exercising control such that the first radio communication unit is made communicable at predetermined intervals, and
if the magnetic field generated in the second radio communication is detected, the first radio communication unit is made communicable at intervals shorter than the predetermined intervals.

9. A non-transitory computer readable medium embodying an executable program for causing a computer to function as a radio communication apparatus, the radio communication apparatus comprising:

a first radio communication unit that performs proximity communication by first radio communication;

a second radio communication unit that performs the proximity communication by second radio communication via a magnetic field;

a detection unit that detects the magnetic field generated in the second radio communication; and a control unit that controls radio communication by the first radio communication unit based on a detection result detected by the detection unit,
wherein the control unit exercises control so that the first radio communication unit is made communicable at predetermined intervals, and
if the magnetic field generated in the second radio communication is detected by the detection unit, the control unit exercises control so that the first radio communication unit is made communicable at intervals shorter than the predetermined intervals.

* * * * *